Jan. 21, 1969 P. FELIX 3,422,616
MANUFACTURE OF THREADS, CORDS, ROPES AND LIKE ARTICLES
Filed Dec. 8, 1965
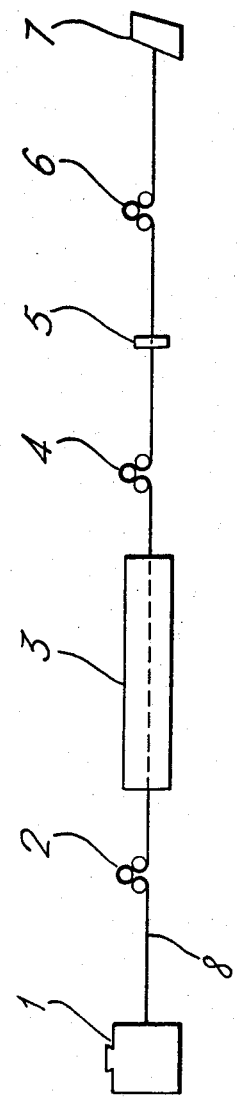
Inventor
Pierre Felix
By Cushman, Darby & Cushman
Attorneys

United States Patent Office 3,422,616
Patented Jan. 21, 1969

3,422,616
MANUFACTURE OF THREADS, CORDS, ROPES AND LIKE ARTICLES
Pierre Felix, Miribel, Ain, France, assignor to Societe Rhodiaceta, Paris, France, a French body corporate
Filed Dec. 8, 1965, Ser. No. 512,455
Claims priority, application France, Dec. 15, 1964, 998,692
U.S. Cl. 57—157    10 Claims
Int. Cl. D02g 3/02; D01h 13/26

ABSTRACT OF THE DISCLOSURE

The invention concerns the production of threads, cords, etc., by fibrillating oriented films, especially of polyolefins, to form narrow strips which are twisted together. The films are fibrillated by strongly compressing them transversely while they are travelling under tension, and while they are in this condition subjecting them to a sudden change of direction. Preferably this is done by passing the film through a false twisting device.

---

This invention relates to the manufacture of textile products in the form of threads, cords, ropes and other similar articles from films of oriented linear synthetic polymeric material, and to the products obtained.

It has long been known to prepare such textile products from films of oriented polymeric material.

It was first proposed to bring linear polycondensates, for example polyamides, into the form of small strips, to twist these strips, and to orient them by stretching during or after the twisting. The products thus manufactured have scarcely been satisfactory.

To obtain a strong flexible product, it has been broadly proposed to stretch, preferably at elevated temperature, a film or ribbon of linear synthetic polymeric material which is orientable in the longitudinal direction, to subject this film, before or after the stretching, to a fibrillation—the fibrillation of a film is easier the higher its degree of orientation—and then to convert it into a textile product of the aforesaid type by twisting. The products obtained are generally satisfactory for many applications.

Various processes for producing the fibrillation of stretched film are already known. For example, two brushes, preferably of metal, may be disposed, one on each side of a stretched film, one being fixed and the other rotatable. This brushing exerts an intense mechanical action which often produces shredding of the film and results, on the one hand, in the presence of broken fibres on the finished product, and on the other hand in a reduction of the dynamometric characteristics of the material.

There have recently been proposed acoustic and electrostatic means, optionally associated with a mechanical action, but such methods, which may be suitable for the production of fibrous materials for use in making non-woven materials, remain delicate to apply and necessitate costly apparatus.

In the process of the present invention a film of oriented linear synthetic polymeric material is fibrillated before it is twisted.

More particularly, the invention comprises a process for the manufacture of textile products in the form of threads, ropes, cords or other similar articles by fibrillating film of oriented linear synthetic polymeric material and twisting, or twisting together, one or more of the resulting fibrillated films, wherein the stretched film is fibrillated by strongly compressing it transversely while holding it under tension, and while it is in this state subjecting it to a sudden change of direction.

In this specification, the term "compression" is used to denote an operation which causes a substantial reduction in the transverse dimension of the film.

By means of the invention, which is easy to carry out, there can readily be produced textile products such as cords which are satisfactory for many applications, as a result notably of their flexibility and their excellent dynamometric characteristics.

The process is applicable to all film-forming polymers which are orientable by stretching. The many polymers which may be employed include polyolefines (polyethylene, polypropylene, etc.), polymers and copolymers of acrylonitrile, polyvinyl chloride and its derivatives, polyamides (e.g., types 6, 6—6, 6–10, 11, etc.) and their copolyamides, polyesters (e.g., polyethylene terephthalate and its copolyesters), and other products.

In carrying out the invention, the polymer may be formed by any method into a film, which is then longitudinally stretched, preferably in such manner as to reach the maximum ease of fibrillation, that is to say, to the highest practicable degree. This stretching can be facilitated by operating at elevated temperature or by any other conventional means. After the stretching, the film is preferably not more than 0.3 mm., and especially between 0.01 and 0.15 mm., thick.

The compression and the sudden change of direction which are essential features of the process may be effected by various means.

One satisfactory device consists of a member, for example of metal, through which there extends a cylindrical passage whose inlet orifice has rounded edges. The diameter of the passage is appreciably smaller than the width of the film to be treated, and the axis of this passage is set at a pronounced acute angle to the direction of movement of the film before it enters the passage (direction-changing angle). The best results are obtained with direction-changing angles smaller than 45° (i.e., the direction of travel changes by more than 135°) and preferably between 20° and 30°. Angles smaller than 10° are less suitable, mainly by reason of the intense friction which the film undergoes on the rounded edges of the device.

The compression and sudden direction-changing operations are preferably carried out at ambient temperature and on film which is at least initially at ambient temperature.

Another advantageous and preferred means is a false-twist spindle, which is a device well known to persons skilled in the art. By an appropriate but conventional passage through the rollers constituting the spindle, the film is strongly compressed upstream during the twisting, undergoes a sudden change of direction in passing over the rollers and is relieved of compression downstream of the spindle during the untwisting. As will be apparent from the examples which follow, this novel application of the false-twist spindle affords many advantages over other apparently equivalent means. For example, this simple and economic means makes it possible to attain readily high speeds of production, so that the manufacture of the films by continuous extrusion can be integrated with the stretching, fibrillating and twisting operations. Moreover, in the simultaneous fibrillation of a number of stretched films, the passage of these films through the same rollers increases the reciprocal cohesion of each of these films and thus prepares them for the final twisting. Finally, the false-twist spindle does not suffer any significant wear.

When the films have been fibrillated, the products are twisted by any appropriate means, optionally after superposition of a number of films, and, if necessary, a heat treatment or other similar setting treatment is applied to the twisted filaments obtained.

The products of the invention may be converted into threads, ropes, cords or other similar articles and thence into woven fabrics, matted fabrics, etc. They have proved particularly interesting in the twine field, e.g. in wrapping twines, twines for agricultural machines (binding twines, bundling twines) etc.

The following examples illustrate but do not limit the invention.

EXAMPLE 1

A film of isotactic polypropylene is formed by extrusion, is stretched at elevated temperature by about six times its original length, after which it is cut into strips 12 mm. wide and about 0.04 mm. thick.

These strips are passed at a speed of 12 m. per min. through a compressing and direction-changing device composed of a metal member 22 mm. in length and 8 mm. in diameter, through which there extends a cylindrical passage 4 mm. in diameter having rounded edges. The angle between the direction of movement of the film before the device and the axis of the cylindrical passage is about 25 degrees, causing a change in the direction of travel of the film of about 155°. A number of the resulting fibrillated films are twisted together with 35 turns per metre, and the product is treated for 5 minutes with steam in an oven at 100° C.

The products obtained possess the following characteristics:

| Number of fibrillated films | Total denier | Breaking strength in kg. | Elongation at rupture in percent |
|---|---|---|---|
| 1 | 5,900 | 21 | 16.2 |
| 2 | 11,850 | 37.6 | 22.1 |
| 3 | 18,200 | 59.5 | 22.7 |

EXAMPLE 2

The apparatus used is illustrated diagrammatically in the accompanying drawing, and comprises a film-forming extruder and slitting device shown generally at 1, sets of drawing rolls 2 and 4 of which in operation the latter run at a higher peripheral speed than the former, a heater 3 between the sets of drawing rolls, a false-twisting spindle 5, feed rolls 6 and a winding up device 7. In operation a strip of film 8 formed by the extruder and slitter 1 passes round the sets of draw rolls, by means of which it is stretched in or immediately after the heater 3; from the second set of draw rolls 4 it passes in contact with the false-twisting spindle 5, and is then fed to the winding up device 7 by the feed rolls 6, which are run at the same peripheral speed as the second set of draw rolls 4. In passing through the false-twisting device the film is subjected, by the rollers of the false-twisting device, on the one hand to a transverse compression upstream and on the other to a sudden change in direction.

The film is of isotactic polypropylene as in Example 1, and is cut into strips which, after being stretched by a factor of 6, are about 12 mm. wide and 0.04 mm. thick. Its rate of travel through the false-twister is 30 m. per min., and the rate of rotation of the false-twist spindle is 6,200 r.p.m.

Three fibrillated films so obtained are twisted together with 40 turns per metre by means of a double twist spindle. After steam treatment under the same conditions as in Example 1, there is obtained a twine having a count of 17,400 denier and a breaking strength of 47.1 kg., with an elongation of 18.1%.

EXAMPLE 3

The same device is employed as in Example 2, but the false-twist spindle rotates only at 3000 r.p.m.

The isotactic polypropylene film is stretched by factors increasing from 8 to 14, whereafter the stretched film is passed through the false-twister at different speeds to fibrillate it.

After superposition of a number of fibrillated films, twisting and steam treatment under the same conditions as in Example 2, there are obtained binding twines whose characteristics are summarised in the table below.

This table shows that the best properties are obtained with isotactic polypropylene film stretched by at least 8 times, and preferably between 10 and 14 times, its original length.

| Stretching factor of the isotactic polypropylene film | Speed of passage of the film through the false-twist spindle in m. per min. | Characteristics of the finished twine ||||||
|---|---|---|---|---|---|---|---|
| | | Count in denier | Strength in kg. | Tenacity in g./dn. | Elongation in percent | Knotted strength in kg. | Loss of knotted strength at rupture in percent |
| 8 | 82 | 27,050 | 85.6 | 3.16 | 18.3 | 69.9 | 18.2 |
|   | 72 | 25,750 | 89.1 | 3.46 | 17.3 | 73 | 18 |
|   | 65 | 26,300 | 84.4 | 3.20 | 16 | 72.1 | 14.6 |
| 9 | 72 | 22,650 | 79.5 | 3.51 | 14.4 | 63.2 | 20.5 |
|   | 65 | 23,200 | 88.5 | 3.81 | 14.6 | 70.4 | 20.5 |
| 10 | 72 | 18,350 | 79.5 | 4.25 | 11.2 | 60.5 | 22.4 |
|   | 65 | 19,600 | 77.5 | 3.95 | 13.4 | 58.8 | 24.1 |
| 11 | 72 | 17,720 | 72 | 4.06 | 12 | 56.3 | 21.8 |
|   | 65 | 18,000 | 70.4 | 3.92 | 12.2 | 53.1 | 24.6 |
| 12 | 65 | 17,050 | 68.3 | 4.06 | 11.4 | 56.2 | 17.7 |
| 14 | 65 | 14,700 | 58.6 | 3.99 | 11.2 | 50.6 | 13.7 |

EXAMPLE 4

A low-pressure (high density) polyethylene film is extruded and stretched in boiling water by about nine times its original length, and cut into strips 12 mm. wide and about 0.04 mm. thick.

This film is fibrillated by means of the device described in Example 2, but the speed of travel through the false-twister is 65 m. per min. and the rate of rotation of the false-twist spindle 3000 r.p.m.

Four films thus fibrillated are twisted together with 40 turns per metre by means of a double-twist spindle.

A twine is obtained which has a count of 21,000 denier, and a breaking strength of 63 kg. with an elongation of 17.8%. This product is suitable, for example, for the manufacture of matted fabrics.

I claim:
1. A process for the production of filamentary textile products by fibrillating an oriented film of a linear synthetic polymeric material and twisting the resulting fibrillated film, wherein the film is fibrillated by causing it to travel under tension through a mechanical false twisting spindle whereby it is strongly compressed transversely, and while in this state is subjected to a sudden change of direction of travel of at least 135°.

2. A process according to claim 1, wherein a plurality of the said fibrillated films is twisted together.

3. A process according to claim 1, wherein the oriented film is less than 0.3 mm. thick.

4. A process according to claim 1, wherein the oriented film is 0.01 to 0.15 mm. thick.

5. A process according to claim 1, wherein the film is oriented by stretching and then fibrillated in a single continuous operation.

6. A process for the manufacture of textile products in the form of threads, ropes, cords or other similar articles, which comprises fibrillating an oriented film of a polyolefin by strongly compressing it transversely while holding it under tension in a false twist spindle, and while it is in this state subjecting it to a sudden change of direction, and twisting the resulting fibrillated film.

7. A process according to claim 6, wherein the polymeric material is an isotactic polypropylene.

8. A process according to claim 6, wherein the film is oriented by stretching it by 8–14 times its initial length.

9. A process according to claim 1, wherein the twisted fibrillated film is heat set.

10. A process according to claim 9, wherein the film is heat set by the action of steam.

References Cited

UNITED STATES PATENTS

| 2,545,869 | 3/1951 | Bailey. | |
|---|---|---|---|
| 2,700,657 | 1/1955 | Look et al. | |
| 2,707,805 | 5/1955 | Smith et al. | |
| 2,920,349 | 1/1960 | White. | |
| 3,003,304 | 10/1961 | Rasmussen | 57—157 |
| 3,242,035 | 3/1966 | White. | |
| 3,293,844 | 12/1966 | Winninger et al. | 57—157 |
| 3,330,104 | 7/1967 | Dunwoody | 57—77.3 |

FOREIGN PATENTS 479,202  2/1938  Great Britain.

FRANK J. COHEN, *Primary Examiner.*

WERNER H. SCHROEDER, *Assistant Examiner.*

U.S. Cl. X.R.

28—1; 57—34, 55.5; 264—103, 147, 290